(12) United States Patent
Tan et al.

(10) Patent No.: US 7,977,913 B2
(45) Date of Patent: Jul. 12, 2011

(54) BATTERY PACK

(75) Inventors: Eng Soon Dave Tan, Singapore (SG); Kwang Sheun Tham, Singapore (SG); Wah Swee Tan, Singapore (SG)

(73) Assignee: STL Energy Technology (S) Pte Ltd, Singapore (SG)

( * ) Notice: Subject to any disclaimer, the term of this patent is extended or adjusted under 35 U.S.C. 154(b) by 857 days.

(21) Appl. No.: 11/660,472

(22) PCT Filed: Nov. 18, 2005

(86) PCT No.: PCT/SG2005/000392
§ 371 (c)(1),
(2), (4) Date: Oct. 19, 2007

(87) PCT Pub. No.: WO2006/080900
PCT Pub. Date: Aug. 3, 2006

(65) Prior Publication Data
US 2008/0169705 A1    Jul. 17, 2008

(30) Foreign Application Priority Data

Jan. 31, 2005   (SG) ............................ 200500536-8

(51) Int. Cl.
*H02J 7/00* (2006.01)
*F21L 4/00* (2006.01)
*H01H 7/00* (2006.01)

(52) U.S. Cl. ........ 320/112; 320/106; 320/121; 362/183; 307/141; 307/134

(58) Field of Classification Search ................ 320/112
See application file for complete search history.

(56) References Cited

U.S. PATENT DOCUMENTS

| 5,621,299 | A | 4/1997 | Krall |
| 5,684,382 | A | 11/1997 | Fritz et al. |
| 5,721,481 | A * | 2/1998 | Narita et al. .............. 320/111 |
| 5,739,667 | A | 4/1998 | Matsuda et al. |
| 5,883,497 | A * | 3/1999 | Turnbull .................... 320/132 |
| 5,903,137 | A * | 5/1999 | Freiman et al. ............. 320/163 |
| 5,945,806 | A | 8/1999 | Faulk |
| 6,018,229 | A | 1/2000 | Mitchell et al. |
| 6,034,504 | A | 3/2000 | Holcomb |
| 6,169,341 | B1 | 1/2001 | Nagai |
| 6,274,950 | B1 * | 8/2001 | Gottlieb et al. .............. 307/66 |
| 6,337,557 | B1 | 1/2002 | Kates et al. |
| 6,414,403 | B2 | 7/2002 | Kitagawa et al. |
| 2004/0027109 | A1 | 2/2004 | Chen |

FOREIGN PATENT DOCUMENTS

| JP | 03540848 | 7/1996 |
| KR | 1020010011174 | 2/2001 |
| TW | 588882 | 5/2004 |
| WO | WO 02/41465 | 5/2002 |

* cited by examiner

*Primary Examiner* — Edward Tso
*Assistant Examiner* — Yalkew Fantu
(74) *Attorney, Agent, or Firm* — Lipsitz & McAllister, LLC

(57) ABSTRACT

A battery pack comprising a rechargeable power source element; an input member for connecting the battery pack to an external power source; an output member for connecting the battery pack to an external device for power supply to the external device a micro-controller for sensing at least one characteristic of an electrical signal from the external power source, and for controlling an output signal at the output member based on the characteristics of the electrical signal.

21 Claims, 8 Drawing Sheets

BATTERY PACK

This application claims the benefit of international application number PCT/SG2005/000392 filed Nov. 18, 2005, which claims priority of Singapore application number 200500536-8 filed Jan. 31, 2005. The international application was published under PCT Article 21(2) in the English language.

FIELD OF INVENTION

The present invention relates broadly to a battery pack and to a method of providing power to a device.

BACKGROUND

Existing universal battery packs typically use a range of interchangeable external dc plugs, keys or output cables to select the desired output voltage for use with a range of portable electronic devices. The output voltage selection is based on the resistor value (or open/short pins) located within the external dc plug, key or output cable of each universal battery pack.

With the dc plug, key or output cable connected, the embedded resistor (or opens/shorts) connects directly or indirectly to the output dc-dc converter feedback path of the universal battery pack to select the desired output voltage. The output current limit of the universal battery pack is either fixed by the output dc-dc converter feedback path design or set by other embedded resistors within the same or another dc plug, key or output cable.

With typical designs such as that mentioned above, some problems may arise with usage of such typical universal battery packs. These problems include:

To support a wide range of portable electronic devices, users typically require a wide range of customised dc plugs, keys or output cables with one or more predetermined resistor values or open/short pins. Therefore, users are more prone to selecting a wrong dc plug, key or output cable.

In order to ensure that the correct dc plug, key or output cable is used to select a particular output voltage, the universal battery packs typically each require an additional plug, key or output cable with a pre-determined resistor value located within as a reference for voltage comparison. This presents a problem as an additional plug, key or output cable is required for use with each typical universal battery pack.

Another problem may be that universal battery packs utilising this typical design are typically prone to noise pick-up and error as the feedback path of an output dc-dc converter may be typically sensitive and especially so if the resistors or open/shorts are situated far away within the feedback path from the output dc-dc converter due to the length of the output cable. Noise pick-up and error may impact system performance and reliability.

Another problem with typical battery packs may be that manufacturers of such external battery packs may also typically include an ac adapter with each battery pack. This is because the battery pack design may not be suitable for use with a variety of ac adapters of different power requirements. The user may therefore be required to carry multiple ac adapters to power multiple portable electronic devices.

SUMMARY

In accordance with a first aspect of the present invention there is provided a battery pack comprising a rechargeable power source element; an input member for connecting the battery pack to an external power source; an output member for connecting the battery pack to an external device for power supply to the external device; a micro-controller for sensing at least one characteristic of an electrical signal from the external power source, and for controlling an output signal at the output member based on the characteristics of the electrical signal.

The micro-controller may enter a programming mode or a matching mode based on a pin signal sensed at the output member.

In the programming mode, the micro-controller may set at least one characteristic of the output signal based on the characteristics of the electrical signal.

The micro-controller may set the characteristics of the output signal to be substantially the same as the characteristics of the electrical signal.

In the matching mode, the micro-controller may select the external power source as source of the output signal if the characteristics of the electrical signal match pre-set characteristics.

In the matching mode, the micro-controller may select the rechargeable power source element as the source of the output signal if the characteristics of the electrical signal do not match pre-set characteristics.

The output signal may be enabled or disabled based on the pin signal sensed at the output member.

The pin signal may be based on the presence of a plug member connected to the output member for connecting the battery pack to an external device for power supply to the external device.

The micro-controller may control the recharging of the rechargeable power source element based on the characteristics of the electrical signal.

The micro-controller may enable a recharging circuit of the battery pack for recharging the rechargeable power source element from the external power source if the characteristics of the electrical signal match pre-set characteristic.

The recharging circuit may comprise a converter element for providing a desired recharging signal to the rechargeable power source element from different external power sources having different electrical signal characteristics.

The characteristics of the electrical signal may comprise a voltage limit, a current limit, or both.

The characteristics of the output signal may comprise a voltage limit, a current limit, or both.

The external power source may comprise an adapter connected to a mains power supply, and the electrical signal comprises an output electrical signal from the adapter.

In accordance with a second aspect of the present invention there is provided a method of providing power to a device, the method comprising providing a battery pack comprising a rechargeable power source element; connecting the battery pack to an external power source; connecting the battery pack to the device; sensing at least one characteristic of an electrical signal from the external power source to the battery pack; and controlling at least one characteristic of an output signal from the battery pack to the device based on the characteristics of the electrical signal.

Either a programming operation or a matching operation may be conducted based on a pin signal sensed at the output member.

The programming operation may comprise setting at least one characteristic of the output signal based on the characteristics of the electrical signal.

The method may comprise setting the characteristics of the output signal to be substantially the same the characteristics of the electrical signal.

The matching operation may comprise selecting the external power source as source of the output signal if the characteristics of the electrical signal match preset characteristic.

The matching operation may comprise selecting the rechargeable power source element as the source of the output signal if the characteristics of the electrical signal do not match pre-set characteristics.

The pin signal is based on the presence of a plug member connected to the output member for connecting the battery pack to an external device for power supply to the external device.

The output signal may be enabled or disabled based on the pin signal sensed at the output member.

The method further comprising controlling the recharging of the rechargeable power source element based on the characteristics of the electrical signal.

The method may comprise enabling a recharging circuit of the battery pack for recharging the rechargeable power source element from the external power source if the characteristics of the electrical signal match pre-set characteristic.

The method may comprise providing a desired recharging signal to the rechargeable power source element from different external power sources having different electrical signal characteristics.

The characteristics of the electrical signal may comprise a voltage limit, a current limit, or both.

The characteristics of the output signal may comprise a voltage limit, a current limit, or both.

The external power source may comprise an adapter connected to a mains power supply, and the electrical signal comprises an output electrical signal from the adapter.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

The example embodiments described hereafter may be able to overcome the shortcomings that have been described previously. The example embodiments may provide a system and a method of selecting an output voltage of a universal battery pack using an ac adapter voltage as reference.

Figure 1:
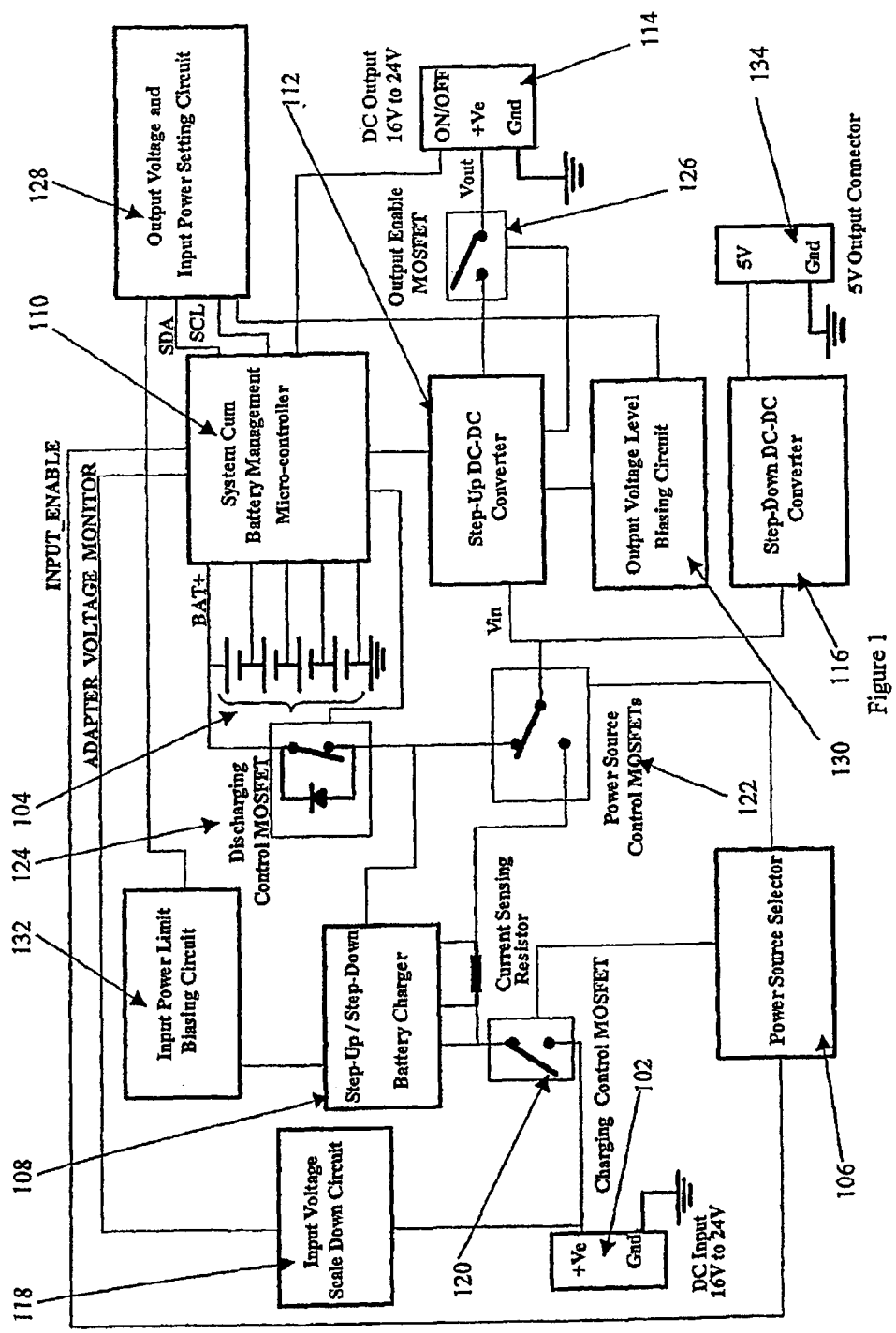
FIG. 1 is a schematic block diagram illustrating the functional blocks for a universal battery pack in an example embodiment.

In an example embodiment, with reference to FIG. 1, a universal battery pack consists of the following functional blocks, such as, an input connector 102 for an ac adapter, a rechargeable power source element in the form of rechargeable battery 104, a power source selector 106, a Step-up/Step-down battery charger 108, a system cum battery management microcontroller 110, a Step-up DC-DC converter 112, a DC output connector 114 and a Step-down DC-DC converter 116. In the example embodiment, the rechargeable battery 104 can be arranged in various parallel and series configurations. Other functional blocks such as an Input Voltage Scale Down Circuit 118, a Charging Control MOSFET 120, a Power Source Control MOSFET 122, a Discharging Control MOSFET 124, an Output Enable MOSFET 126, an Output Voltage and Input Power Setting Circuit 128, an Output Voltage Level Biasing Circuit 130, an Input Power Limit Biasing Circuit 132 and an Output Connector 134 are also present in the universal battery pack.

Figure 2:
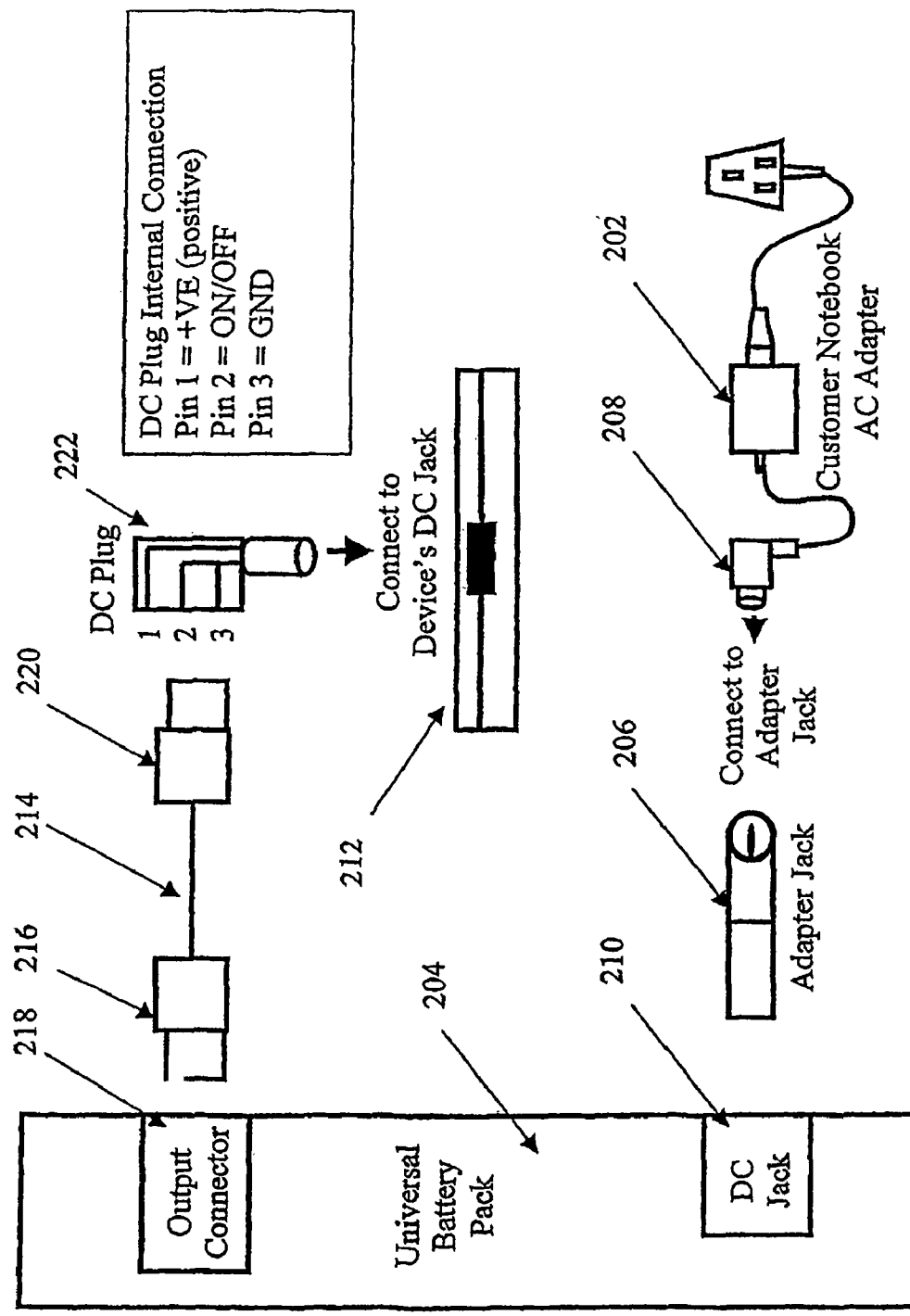
FIG. 2 is a schematic drawing of an adapter jack used connections from an ac adapter to a dc jack of a universal battery pack in an example embodiment.

In the example embodiment, the input connector 102 is the input for an ac adapter. As illustrated in FIG. 2, different ac adapters, for example 202, can be connected to the universal battery pack through the use of an adapter jack 206, which may be a dc power jack to dc plug adapter or an equivalent cable assembly, if the dc plugs 208 of the ac adapters 202 do not match the dc power jack 210 (labelled as 102 in FIG. 1). The battery pack 204 can in turn be connected to an external device such as a laptop computer 212 via a lead 214 through an interchangeable dc plug 222. A dc plug 216 of the lead 214 is received at an output connector 218 (labelled as 114 in FIG. 1) of the battery pack 204 whereas another dc plug 220 of the lead 214 is connected to the interchangeable dc plug 222. The interchangeable dc plug 222 is connected to a dc jack input (not shown) of the external device 212 where the ac adapter power source of the external device 212 is typically connected.

In the following, internal functions of the universal battery pack in an example embodiment are described. First, it is described how the universal battery pack performs sensing of the presence and state of the ac adapter 202, the rechargeable battery 104 (FIG. 1), or both. Power path selection based on the sensing is also described.

Figure 3:
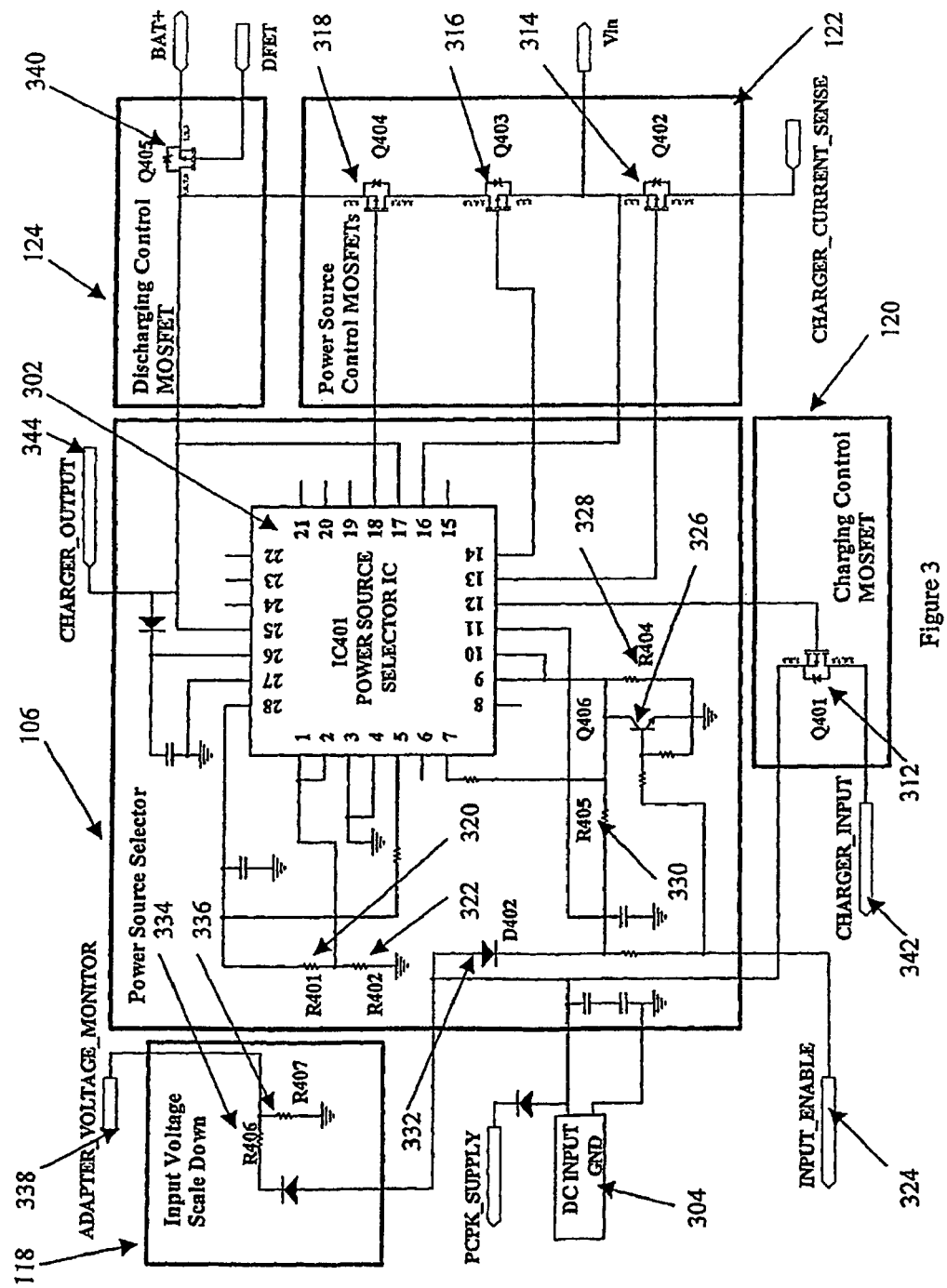
FIG. 3 is a schematic diagram of a power source selector in an example embodiment.

FIG. 3 is a schematic illustration of the circuit layout of functional blocks Power Source Selector 106, Input Voltage Scale-Down 118, Charging Control MOSFET 120, Power Source Control MOSFET 122 and Discharging Control MOSFET 124 as illustrated in FIG. 1.

With reference to FIG. 3, in the example embodiment, the power source selector IC 302 performs power path selection between an ac adapter source voltage 304 (labelled as 102 in FIG. 1), a Step-up/Step-down battery charger 108 (FIG. 1) and a rechargeable battery 104 (FIG. 1). The power path selection may be carried out by routing charge and discharge currents between each of the ac adapter source voltage 304, the Step-up/Step-down battery charger 108 (FIG. 1) and the rechargeable battery 104 (FIG. 1) and the system load. The system load, in the example embodiment, is the input to the step-up DC-DC converter 112 (FIG. 1). Routing of charge and discharge currents in the example embodiment may be carried out using four P-channel MOSFET switches, for example 312, 314, 316, 318.

In the example embodiment, the power source selector IC 302 implements a fast fixed break-before-make timer so as to ensure that the power sources, for example the ac adapter source voltage 304 and the rechargeable battery 104 (FIG. 1), are not connected together, as well as to allow hot swapping of power sources and to provide a continual power source to the system load.

In addition, in the example embodiment, the power source selector IC 302 monitors the rechargeable battery 104 (FIG. 1) and the as adapter source voltage 304, through its respective sensing pins. The state and presence of the rechargeable battery 104 (FIG. 1) and the ac adapter source voltage 304 are used by the power source selector IC 302 to determine which one of the power sources, for example the ac adapter source voltage 304 and the rechargeable battery 104 (FIG. 1), to select for the system load and whether to charge the rechargeable battery 104 (FIG. 1) using the ac adapter source voltage 304.

In the example embodiment, during the monitoring of the rechargeable battery 104 (FIG. 1), the power source selector IC 302 determines the absence of the rechargeable battery 104 (FIG. 1) and whether the rechargeable battery 104 (FIG. 1) is undervoltage. In the example embodiment, removal and absence of the rechargeable battery 104 (FIG. 1) is detected when the respective sensing pin of the power source selector IC 302 falls below a voltage of about 2V. While for the sensing of whether the rechargeable battery 104 (FIG. 1) is undervoltage, the battery undervoltage threshold may be set by a resistive voltage divider comprising resistors, for example 320 and 322. The power source selector IC 302 does not allow discharge from an undervoltage battery in the example embodiment.

In the example embodiment, an ac adapter is detected when the "Input Enable" signal 324 is "low" to turn-off the transistor 326 and when the voltage at the respective sensing pin of the power source selector IC 302 is above the threshold voltage set by the resistive voltage divider comprising resistors, for example 328 and 330. Reverse ac adapter protection may be provided by diode 332 in the example embodiment.

In the example embodiment, when an ac adapter is connected to the universal battery pack, it will turn-on transistor 326. This causes the respective sensing pin of the power source selector IC 302 to be grounded. As such, the power source selector IC 302 will first note that no ac adapter has been detected. This is to ensure that the ac adapter source voltage 304 is first monitored to be suitable before being used. In the example embodiment, an "Input Voltage Scale Down" resistive voltage divider comprising of resistors, for example 334 and 336, scales down the ac adapter source voltage 304 and an "Adapter_Voltage_Monitor" signal 338 is then be routed to the System cum Battery Management Micro-controller 110 (FIG. 1).

Figure 4:
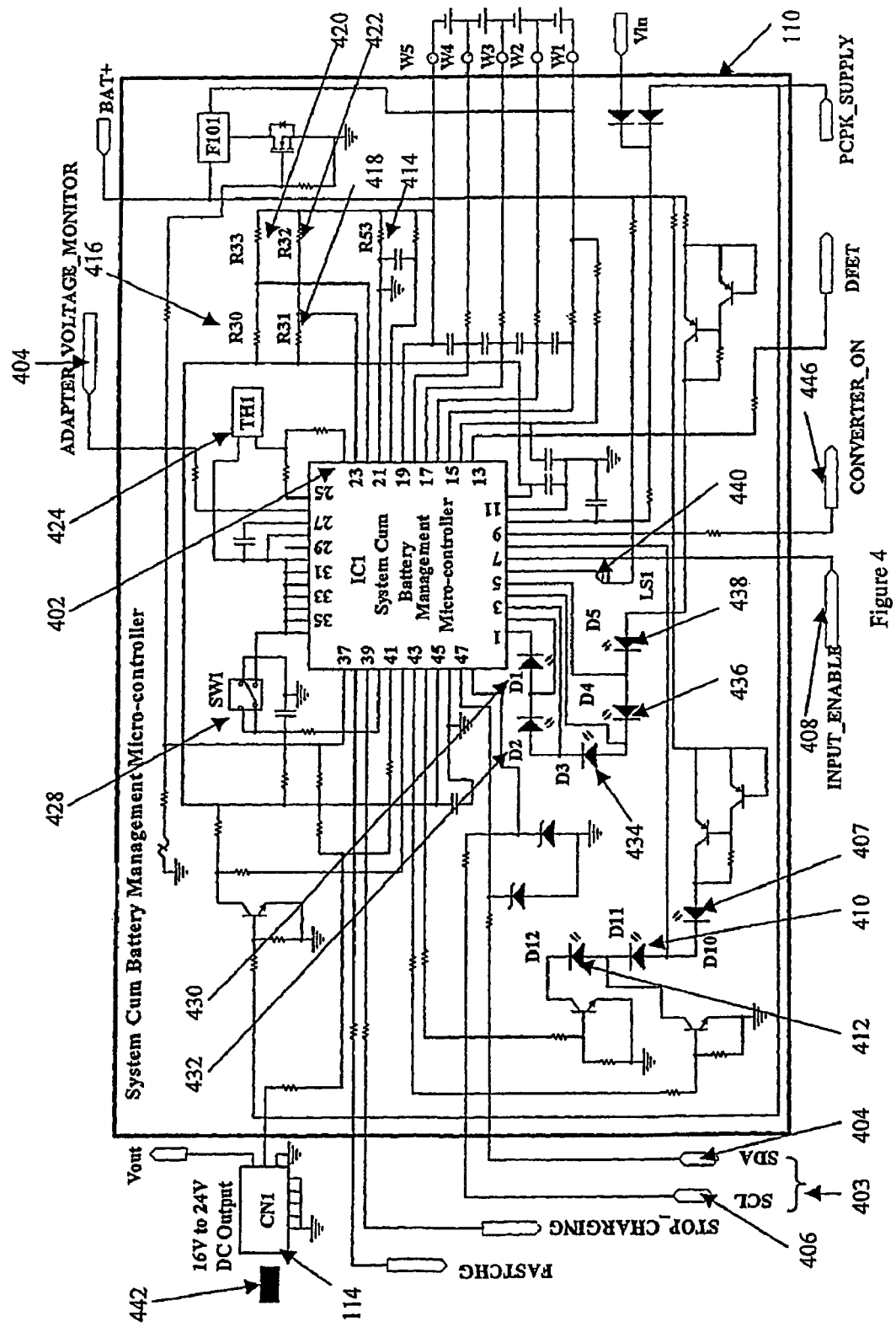
FIG. 4 is a schematic diagram of a system cum battery management micro-controller in an example embodiment.

FIG. 4 is a schematic illustration of the circuit layout of functional blocks comprising the DC output connector 114 and the System cum Battery Management Micro-controller 110 as illustrated in FIG. 1.

With reference to FIG. 4, a System cum Battery Management Micro-controller 402 receives the "Adapter_Voltage_Monitor" signal 404 (labelled as 338 in FIG. 3) at a respective pin which acts as an analog to digital converter (ADC), so as to measure the ac adapter source voltage 304 in the example embodiment.

After measurement of the voltage from the ac adapter connected to the universal battery pack, the universal battery pack in the example embodiment will check if an external dc plug 442 (labelled as 216 in FIG. 2) is currently connected to the DC output connector 114 during programming of its input and output electrical characteristics. Two scenarios are considered during the programming. One scenario is when no external dc plug 442 is connected and another is when the universal battery pack has already been programmed previously and is utilising a programmed set of electrical characteristics such as a fixed output voltage and output current with an external dc plug 442 connected. In the following, both scenarios are described with details of the components utilised in the universal battery pack.

With reference to FIG. 4, in the example embodiment, when an external dc plug 442 is not connected to the DC output connector 114, the System cum Battery Management Micro-controller 402 will sense that the ON/OFF signal at the DC output connector 114 is not grounded. A non-grounded ON/OFF signal at the DC output connector 114 has an effect of indicating to the System cum Battery Management Micro-controller 402 that the output voltage of the universal battery pack can be programmed. Similarly, in order to re-program a previously programmed universal battery pack to another ac adapter source voltage 304 (FIG. 3), the external dc plug 442 (FIG. 4) is first disconnected from the DC output connector 114 since disconnecting the external dc plug 442 disables any previously programmed output of the universal battery pack in the example embodiment.

In the example embodiment, when the external dc plug 442 is connected to the DC output connector 114, the System cum Battery Management Micro-controller 402 will sense that the ON/OFF signal at the DC output connector 114 has been grounded. The System cum Battery Management Micro-controller 402 will then carry out voltage matching where the previously programmed output voltage of the universal battery pack is compared with the current sensed ac adapter source voltage 304 (FIG. 3).

Figure 5:
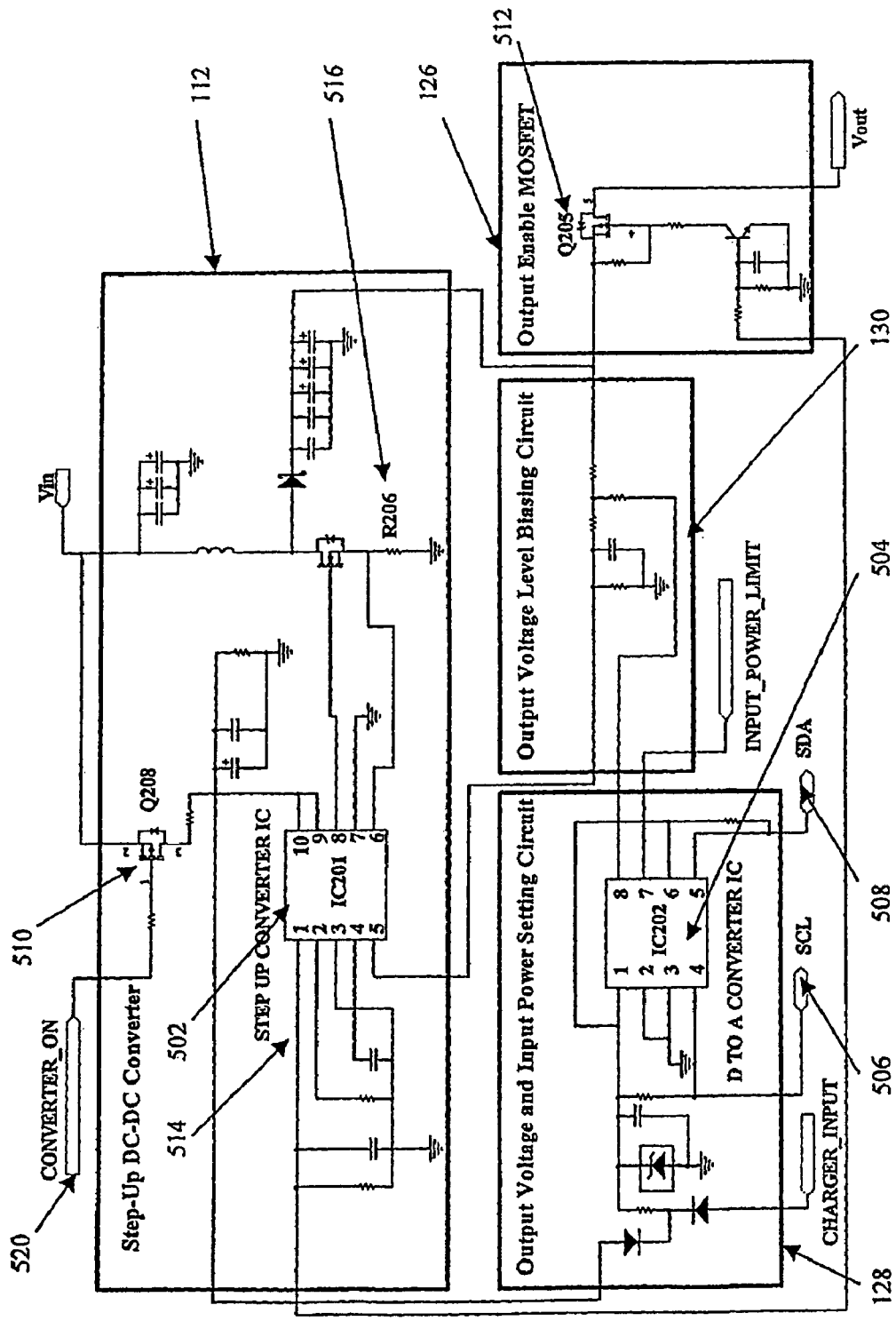
FIG. 5 is a schematic diagram of a step-up dc-dc converter in an example embodiment.

FIG. 5 is a schematic illustration of the circuit layout of functional blocks comprising the Step-up DC-DC converter 112, the Output Enable MOSFET 126, the Output Voltage and Input Power Setting Circuit 128 and the Output Voltage Level Biasing Circuit 130 as illustrated in FIG. 1.

With reference to FIG. 5, after measurement of the ac adapter source voltage 304 (FIG. 3) in the example embodiment, the universal battery pack is determined as not currently programmed with any electrical characteristics if the output voltage of a step-up dc-dc converter IC 502 has not been either previously selected or was previously selected but without the external dc plug 442 (FIG. 4) connected for reprogramming purposes. The System cum Battery Management Micro-controller 402 (FIG. 4) will then proceed to program the desired input power limit and output voltage. In the example embodiment, the System cum Battery Management Micro-controller 402 will blink one of the light-emitting diodes (LEDs), for example 407, 410 or 412 (FIG. 4), to indicate that programming is in progress. The blinking LED, for example 407, 410 or 412 (FIG. 4), is also used for indicating visually that the output voltage is being programmed based on the sensed ac adapter source voltage 304 and the LED, for example 407, 410 or 412 (FIG. 4), will be turned off once programming is completed. The output current limit is set by the firmware if the selected power source is the rechargeable battery 104 (FIG. 1) or in this case, if the ac adapter source voltage 304 (FIG. 3) is sensed, the output power will be limited by the ac adapter power limit.

In the example embodiment, the programming by the System cum Battery Management Micro-controller 402 (FIG. 4) is via utilising a digital-to-analog converter (DAC) or digital potentiometer IC 504 based on the ac adapter source voltage 304 (FIG. 3) through its System Management Bus (SMBus) 403, that comprises a SMBus data line (SDA) 404 and a SMBus clock line (SCL) 406, and similarly labelled as SDA 508 and SCL 506 in FIG. 5.

In the example embodiment, with reference to FIG. 4, once programming by the System cum Battery Management Micro-controller 402 is completed, the System cum Battery Management Micro-controller 402 then switches the "Input Enable" signal 408 to "low". Referring to FIG. 3, when the "Input Enable" signal 324, labelled as 408 in FIG. 4, is "low", transistor 326 is turned-off to signal ac adapter presence. This informs the power source selector IC 302 to select the sensed ac adapter source voltage 304 as the power source.

With reference to FIG. 5, in the second scenario where the universal battery pack has already been programmed previously as the output voltage of the step-up dc-dc converter IC 502 was previously selected with an external dc plug 442 (FIG. 4) connected, the output voltage of the universal battery pack is compared with the sensed ac adapter source voltage 304 (FIG. 3) in the example embodiment.

In the scenario where the universal battery pack has already been programmed previously, the programmed output voltage of the universal battery pack is compared with the sensed ac adapter source voltage 304 (FIG. 3). If both voltages match, the ac adapter will be accepted as a suitable power source. Conversely, if both voltages are a mismatch, the ac adapter is not utilised and the rechargeable battery 104 (FIG. 1) will remain as the power source providing the previously programmed electrical characteristics. Both comparison cases are described in the following.

In the event where the output voltage of the universal battery pack is a match with the sensed ac adapter source voltage 304 (FIG. 3) in the example embodiment, with reference to FIG. 4, the System cum Battery Management Micro-controller 402 now switches the "Input Enable" signal 408 to "low". Referring to FIG. 3, when the "Input Enable" signal 324, labelled as 408 in FIG. 4, is "low", transistor 326 is turned-off to signal ac adapter presence. This allows the power source selector IC 302 to select the sensed ac adapter source voltage 304 as the power source.

In the event where the output voltage of the universal battery pack is mismatched with the sensed ac adapter source voltage 304 (FIG. 3) in the example embodiment, with reference to FIG. 4, the System cum Battery Management Micro-controller 402 will blink the LEDs, for example 407, 410 and 412, to indicate a mismatch until the sensed ac adapter source voltage 304 is unplugged. With reference to FIG. 3, the transistor 326 remains turn-on to disable the ac adapter source voltage 304 from being selected as the power source. Thus, in the example embodiment, the output voltage of the universal battery pack remains at its previous setting with the rechargeable battery 104 (FIG. 1) remaining as the power source in the absence of a suitable ac adapter source voltage 304 (FIG. 3).

Upon utilising the rechargeable battery 104 (FIG. 1) as the power source, with reference to FIG. 3, in the absence of a suitable sensed ac adapter source voltage 304 and provided that the rechargeable battery 104 (FIG. 1) is not undervoltage, the power source selector IC 302 disables the charge path by turning off transistors 312 and 314. The power source selector IC 302 instead enables the discharge path by turning on transistors, for example 316 and 318, together with transistor 340 being turned on by the System cum Battery Management Micro-controller 402 (FIG. 4) for discharge purposes. In this configuration, the rechargeable battery 104 (FIG. 1) is selected as the power source to supply current to the system load.

In the following, when the voltage from the ac adapter is selected as the power source, the recharging of the rechargeable battery 104 (FIG. 1) by the ac adapter with simultaneous use of the ac adapter is described. The charger circuitry in the universal battery pack in the example embodiment will prevent overloading of the ac adapter. In addition, the step-up and step-down feature of the charger circuitry ensures that the rechargeable battery 104 (FIG. 1) may be recharged by ac adapters with a wide range of electrical characteristics.

In the example embodiment, with reference to FIG. 3, with the sensed ac adapter source voltage 304 selected as the power source and with a charge path enabled by the power source selector IC 302 via setting its respective pin at a "high" voltage, the power source selector IC 302 connects the rechargeable battery 104 (FIG. 1) to a Step-up/Step-down battery charger 108 (FIG. 1), by turning on transistor 312. At the same time, the power source selector IC 302 connects the ac adapter source voltage 304 to the system load by turning on transistor 314. Thus, the ac adapter source voltage 304 is utilised to charge the rechargeable battery 104 (FIG. 1) via the Step-up/Step-down battery charger 108 (FIG. 1) while supplying power to the system load. Thus, simultaneous charging of the rechargeable battery 104 (FIG. 1) and utilisation of the ac adapter source voltage 304 are implemented by the power source selector IC 302.

Figure 6:
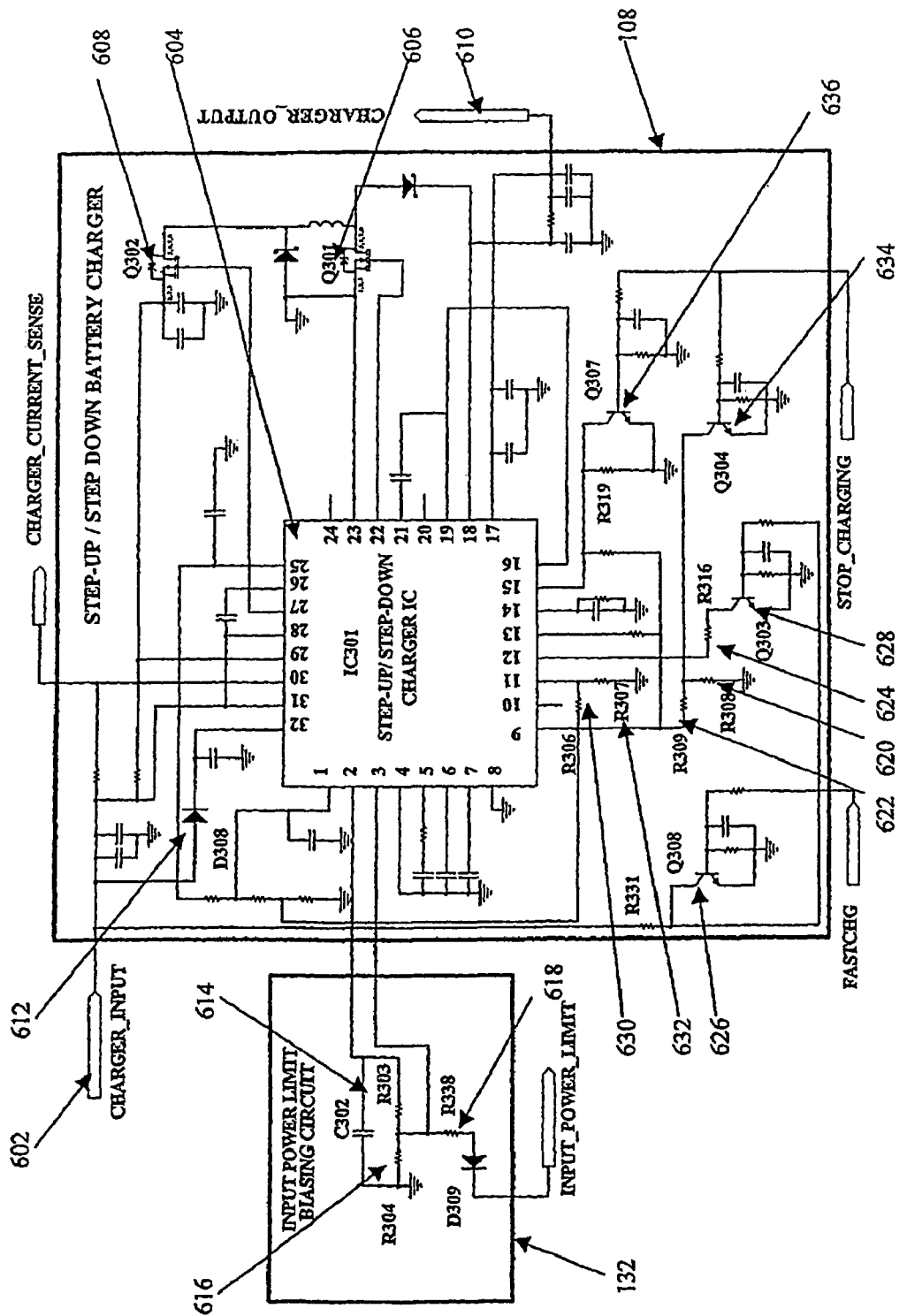
FIG. 6 is a schematic diagram of a step-up/step-down battery charger in an example embodiment.

FIG. 6 is a schematic illustration of the circuit layout of functional blocks comprising the Step-up/Step-down battery charger 108 and the Input Power Limit Biasing Circuit 132 as illustrated in FIG. 1.

With reference to FIG. 6, a "Charger_input" signal 602 (labelled as 342 in FIG. 3) to the step-up/step-down multichemistry charger 604 is a voltage sensed from the ac adapter source voltage 304 via the power source selector IC 302. The step-up/step-down multichemistry charger 604 may charge with battery voltages above and below the ac adapter source voltage 304 using a high efficiency H-bridge topology dc-dc converter to control charge voltage and current utilising a low-side N-channel MOSFET 606 and a high-side P-channel MOSFET 608 as illustrated in FIG. 6. The charger output signal 610 (labelled as 344 in FIG. 3) is connected to the rechargeable battery 104 (FIG. 1) via the power source selector IC 302 (FIG. 3). In the example embodiment, analog inputs are used to control and program the ac adapter current, charge current and battery voltage.

In the example embodiment, reverse ac adapter protection is provided by a diode 612. A programmable input current limit utilising an "Input Power Limit Biasing" circuit 132 allows setting a maximum input current for the universal battery pack in the example embodiment as well as ensuring that the ac adapter providing the ac adapter source voltage 304 (FIG. 3) is not overloaded when it is supplying the system load and battery charger simultaneously. The total input current from the ac adapter is typically a function of the system load current and battery charge current.

In the example embodiment, the step-up/step-down multichemistry charger 604 limits the ac adapter current by reducing the charge current when the input current exceeds the input current limit. As the system load current rises, the available charge current decreases linearly to zero in proportion to the system load current. The input current limit is set by a resistive voltage divider comprising resistors, for example 614, 616 and 618, and the digital-to-analog converter (DAC) or digital potentiometer IC 504 (FIG. 5) controlled via the System cum Battery Management Micro-controller 402 (FIG. 4) based on the sensed ac adapter source voltage 304 (FIG. 3).

The feature of limiting the ac adapter current together with the step-up/step-down charging capability supports the use of the universal battery pack in the example embodiment with a wide range of ac adapters with different power requirements. The pre-charge and fast-charge current in the example embodiment are set by a resistive voltage divider comprising resistors, for example 620, 622 and 624, and are controlled by the System cum Battery Management Micro-controller 402 (FIG. 4) via transistors, for example 626 and 628, depending the voltage of the rechargeable battery 104 (FIG. 1). The charge voltage is set by a resistive voltage divider comprising resistors, for example 630 and 632.

As described previously, voltage matching is carried out when the external dc plug 442 (FIG. 4) is connected to the DC output connector 114 (FIG. 4). In the example embodiment, if there is a voltage mismatch, the sensed ac adapter source voltage 304 (FIG. 3) will not be selected as the power source by the Power Source Selector IC 302. This will also prevent the sensed ac adapter source voltage 304 (FIG. 3) from recharging the rechargeable battery 104 (FIG. 1) even though it is connected.

Conversely, if the external dc plug 442 (FIG. 4) is not connected to the DC output connector 114 (FIG. 4), no voltage matching is required in the example embodiment. Thus, the sensed ac adapter source voltage 304 (FIG. 3) will be used to program the universal battery pack. It will then recharge the rechargeable battery 104 (FIG. 1) and provide a power supply to the system load at the same time.

In the following, when the rechargeable battery 104 (FIG. 1) is fully charged or when the voltage from the ac adapter is removed, the power management feature of the charger circuitry is described.

When the ac adapter providing the ac adapter source voltage 304 (FIG. 3) is removed, the step-up/step-down multichemistry charger 604 shuts down to a low power state, and may typically consume a low current of about 1 A when the respective sensing pin of the step-up/step-down multichemistry charger 604 falls to a "low" voltage level below of about 7.5V. In the example embodiment, when the rechargeable battery 104 (FIG. 1) is fully charged, the System cum Battery Management Micro-controller 402 (FIG. 4) will, switch the respective sensing pin of the step-up/step-down multichemistry charger 604 to "low" via utilising a transistor 634. The System cum Battery Management Micro-controller 402 (FIG. 4) also cuts off the charge current and switches another respective pin of the step-up/step-down multichemistry charger 604 to "low" via a transistor 636. Therefore, the System cum Battery Management Micro-controller 402 (FIG. 4) shuts down the step-up/step-down multichemistry charger 604 for power management when the rechargeable battery 104 (FIG. 1) is fully charged.

In the following, the characteristics of the System cum Battery Management Micro-controller 402 (FIG. 4), the step-up DC-DC converter 112 (FIG. 5) and the step-down DC-DC converter 116 (FIG. 7) are described.

In the example embodiment, the System cum Battery Management Micro-controller 402, referred to in FIG. 4, and its firmware provide the system and battery management functions required to implement the universal battery pack design as described.

In the example embodiment and with reference to FIG. 4, the battery management functions may include, among others, supporting 2-cell, 3-cell or 4-cell battery configurations; implementing a battery management state machine; providing battery voltage measurements, over-voltage and under-voltage protection, for example via its analog front end pins; providing battery current measurements and over-current protection by firmware via current sensing using a resistor 414 and the respective pins of the System cum Battery Management Micro-controller 402 and over-current protection by hardware via resistors, for example 416, 418, 420 and 422, and the respective pins of the System cum Battery Management Micro-controller 402; providing over-temperature and under-temperature protection via a thermistor 424 and a respective pin of the System cum Battery Management Micro-controller 402; providing fuel gauge functions using a tact switch 428 and LEDs, for example 430, 432, 434, 436 and 438, for indicating charging status and remaining battery capacity; and a buzzer 440 alarm for low remaining battery capacity and over-temperature/under-temperature charge/discharge condition; and implementing pre-charge and fast-charge processes depending on each battery voltage condition.

In the example embodiment, the system management functions may include, among others, better power management by switching off the step-up/step-down multichemistry charger 604 (FIG. 6) when the rechargeable battery 104 (FIG. 1) is fully charged and switching off the step-up dc-dc converter IC 502 (FIG. 5) when the external dc plug 442 (FIG. 4) is not connected to the DC output connector 114 (FIG. 4) of the universal battery pack in the example embodiment; capability of selecting and programming input and output power based on sensing the ac adapter source voltage 304 (FIG. 3) and where the output voltage selected may also be visually indicated using LEDs, for example 407, 410 and 412; sensing the ac adapter source voltage 304 (FIG. 3) for selecting and programming the required input and output power to provide similar power requirements as the user's ac adapter (as was described); providing protection against wrong output voltage and power setting when the universal battery pack in the example embodiment is used with an incorrect ac adapter if the output has been previously set with the external dc plug 442 (FIG. 4) connected; and providing protection for the universal battery pack in the example embodiment by releasing the over-current condition only when the external output cable and dc plug are removed.

In the example embodiment, the step-up DC-DC converter 112, as illustrated in FIG. 5, comprises a constant frequency, pulse-width-modulating (PWM) current-mode step-up DC-DC converter IC 502. The step-up DC-DC converter 112 takes its input from either an ac adapter source voltage 304 (FIG. 3) or a rechargeable battery 104 (FIG. 1), selected by the power source selector IC 302 (FIG. 3), to provide a dc output voltage. The dc output voltage is set by the Output Voltage Level Biasing Circuit 130, and the digital-to-analog converter (DAC) or digital potentiometer IC 504. The digital-to-analog converter (DAC) or digital potentiometer IC 504 is controlled via the System cum Battery Management Micro-controller 402 (FIG. 4) through SDA 508 and SCL 506 (similarly labelled as SDA 404 and SCL 406 in FIG. 4) based on the sensed ac adapter source voltage 304 (FIG. 3).

In the example embodiment, when the external dc plug 442 (FIG. 4) is connected to the DC output connector 114 (FIG. 4), the System cum Battery Management Micro-controller 402 will sense that the ON/OFF signal at the DC output connector 114 (FIG. 4) is grounded and will turn on one of the LEDs, for example 407, 410 or 412 (FIG. 4), to indicate the previously programmed output voltage. At the same time, the System cum Battery Management Micro-controller 402 (FIG. 4) will switch on the step-up dc-dc converter IC 502 via transistor 510, in the example embodiment. The System cum Battery Management Micro-controller 402 (FIG. 4) controls the step-up dc-dc converter IC 502 via a "Converter_On" signal 520 (similarly labelled as 446 in FIG. 4) connected to the transistor 510. Switching on the step-up dc-dc converter IC 502 is for enabling the output voltage only when the external dc plug 442 (FIG. 4) is connected to the universal battery pack in the example embodiment for better power management. A transistor 512 acts as an output enable MOSFET providing a soft-start feature where the output is enabled only when the LDO 514 (signal from the step-up dc-dc converter IC 502) reaches a set threshold voltage. A resistor 516 is used to set the maximum output current limit for over-current protection of the universal battery pack in the example embodiment.

Figure 7:
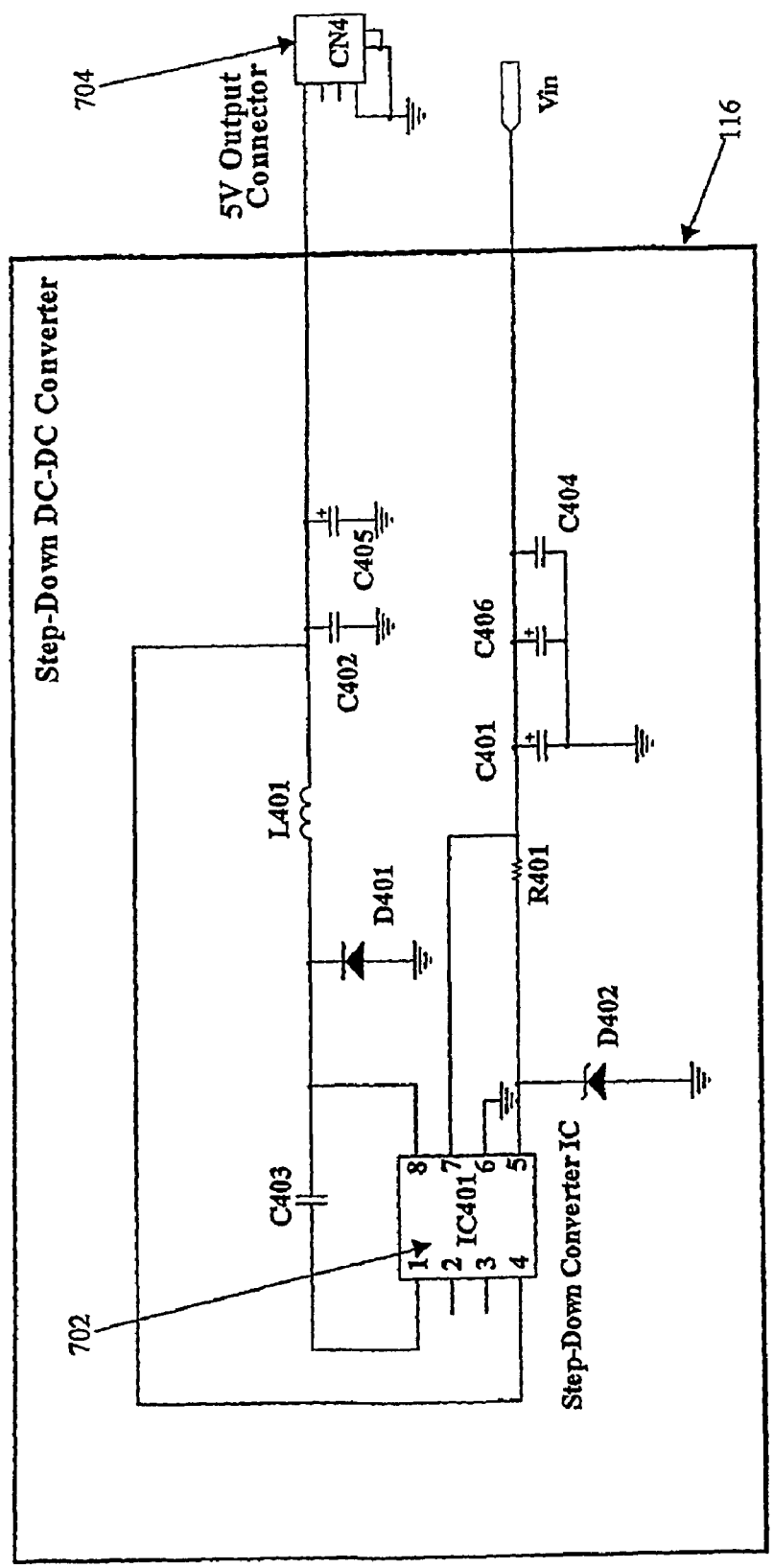
FIG. 7 is a schematic diagram of a step-down dc-dc converter in an example embodiment.

FIG. 7 is a schematic illustration of the circuit layout of a functional block comprising the Step-down DC-DC converter 116.

In the example embodiment, with reference to FIG. 7, the step-down DC-DC converter 116 is a 5V step-down voltage regulator that is capable of driving a load of up to about 1A. The step-down DC-DC converter IC 702 provides an output for lower voltage mobile devices via a USB connector 704 (similarly labelled as 134 in FIG. 1).

In the example embodiment described, an ac adapter source voltage 304 may be utilised to program the output voltage, output current limit, input power limit required for appliances utilising the universal battery pack. This may provide a selectable output power and voltage similar to that of the user's ac adapter and the universal battery pack in the example embodiment may function as the user's ac adapter in the absence of an AC/DC outlet. The universal battery pack in the example embodiment may also be protected against switching to an incorrect output voltage and power when a different or wrong ac adapter is connected to itself. The universal battery pack in the example embodiment also supports charge and use where when it is used with an ac adapter, the ac adapter may provide power to the portable electronic device with any remaining power capacity utilised for charging the universal battery pack.

In the example embodiment, both system and battery management issues are addressed. Besides the battery management functions such as voltage protection, current protection, temperature protection, charging status indication, remaining capacity status indication and low battery condition alarm, this design must also be able to provide system power management, selectable input and output power to support a wide range of portable electronic devices and their ac adapters. These functions are achieved using a system cum battery micro-controller-based system design as described in the example embodiment. It is also noted that, in the example embodiment, the concept of programmable input current limit, charge voltage and charge current can also be implemented using SMBus when used with a SMBus-enabled charger.

Figure 8:
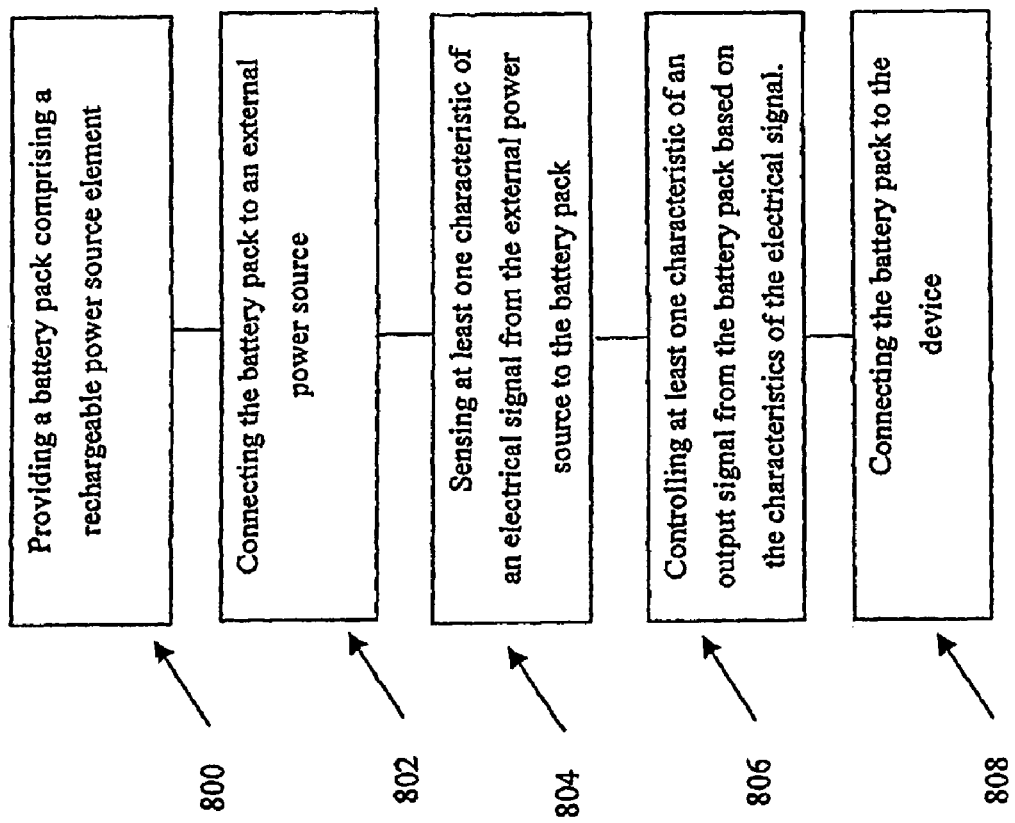
FIG. 8 is a flowchart illustrating a method of providing power to a device in an example embodiment.

FIG. 8 is a flowchart illustrating a method of providing power to a device in an example embodiment. At step 800 a battery pack comprising a rechargeable power source element is provided. At step 802, the battery pack is connected to an external power source. At step 804, at least one characteristic of an electrical signal from the external power source to the battery pack is sensed, and at step 806, at least one characteristic of an output signal from the battery pack is controlled based on the characteristics of the electrical signal. At step 808, the battery pack is connected to the device.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A battery pack comprising: a rechargeable battery; an input member for connecting the battery pack to an external power source; an output member for connecting the battery pack to an external device for power supply to the external device; a micro-controller for sensing at least one characteristic of an electrical signal supplied from the external power source connected to the input member, and for controlling an output signal at the output member based on the sensed characteristics of the electrical signal supplied from the external power source connected to the input member; and wherein: in a programming mode, the micro-controller is capable of setting characteristics of the output signal to be substantially the same as the sensed characteristics of the electrical signal supplied from the external power source: and the characteristics of the output signal and the sensed characteristics of the electrical signal supplied from the external power source each comprise at least one of a voltage limit and a current limit.

2. The battery pack as claimed in claim 1, wherein the micro-controller enters the programming mode or a matching mode based on a pin signal sensed at the output member.

3. The battery pack as claimed in claim 2, wherein, in the programming mode, the micro-controller sets at least one characteristic of the output signal based on the sensed characteristics of the electrical signal supplied from the external power source.

4. The battery pack as claimed in claim 2, wherein, in the matching mode, the micro-controller:
selects the external power source as a source of the output signal if the sensed characteristics of the electrical signal supplied from the external power source match pre-set characteristics; and
selects the rechargeable battery as the source of the output signal if the sensed characteristics of the electrical signal supplied from the external power source do not match pre-set characteristics.

5. The battery pack as claimed in claim 2, wherein the output signal is enabled or disabled based on the pin signal sensed at the output member.

6. The battery pack as claimed in claim 2, wherein the pin signal is based on the presence of a plug member connected to the output member for connecting the battery pack to an external device for power supply to the external device.

7. The battery pack as claimed in claim 1, wherein the micro-controller controls the recharging of the rechargeable battery based on the sensed characteristics of the electrical signal supplied from the external power source.

8. The battery pack as claimed in claim 7, wherein the micro-controller enables a recharging circuit of the battery pack for recharging the rechargeable battery from the external power source if the sensed characteristics of the electrical signal supplied from the external power source match pre-set characteristics.

9. The battery pack as claimed in claim 8, wherein the recharging circuit comprises a converter element for providing a desired recharging signal to the rechargeable battery from different external power sources having different electrical signal characteristics.

10. The battery pack as claimed in claim 1, wherein the characteristics of at least one of the electrical signal and the output signal comprise both the voltage limit and the current limit.

11. The battery pack as claimed in claim 1, wherein the external power source comprises an adapter connected to a mains power supply, and the electrical signal comprises an output electrical signal from the adapter.

12. A method of providing power to a device, the method comprising: providing a battery pack comprising a rechargeable battery; connecting the battery pack to an external power source at an input member of the battery pack; connecting the battery pack to the device at an output member of the battery pack; sensing at least one characteristic of an electrical signal supplied from the external power source to the battery pack; and controlling at least one characteristic of an output signal from the battery pack to the device based on the sensed characteristics of the electrical signal supplied from the external power source; and if in a programming operation, setting characteristics of the output signal to be substantially the same as the sensed characteristics of the electrical signal supplied from the external power source; and wherein the characteristics of the output signal and the sensed characteristics of the electrical signal supplied from the external power source each comprise at least one of a voltage limit and a current limit.

13. The method as claimed in claim 12, wherein either the programming operation or a matching operation is conducted based on a pin signal sensed at the output member.

14. The method as claimed in claim 13, wherein the matching operation comprises:
selecting the external power source as a source of the output signal if the sensed characteristics of the electrical signal supplied from the external power source match pre-set characteristics; and
selecting the rechargeable battery as the source of the output signal if the sensed characteristics of the electrical signal supplied from the external power source do not match pre-set characteristics.

15. The method as claimed in claim 13, wherein the output signal is enabled or disabled based on the pin signal sensed at the output member.

16. The method as claimed in claim 13, wherein the pin signal is based on the presence of a plug member connected to the output member for connecting the battery pack to an external device for power supply to the external device.

17. The method as claimed in claim 12, comprising controlling the recharging of the rechargeable battery based on the sensed characteristics of the electrical signal supplied from the external power source.

18. The method as claimed in claim 17, comprising enabling a recharging circuit of the battery pack for recharging the rechargeable battery from the external power source if the sensed characteristics of the electrical signal supplied from the external power source match pre-set characteristics.

19. The method as claimed in claim 18, comprising providing a desired recharging signal to the rechargeable battery from different external power sources having different electrical signal characteristics.

20. The method as claimed in claim 12, wherein the characteristics of at least one of the electrical signal and the output signal comprise both the voltage limit and the current limit.

21. The method as claimed in claim 12, wherein the external power source comprises an adapter connected to a mains power supply, and the electrical signal comprises an output electrical signal from the adapter.

* * * * *